Patented Mar. 10, 1936

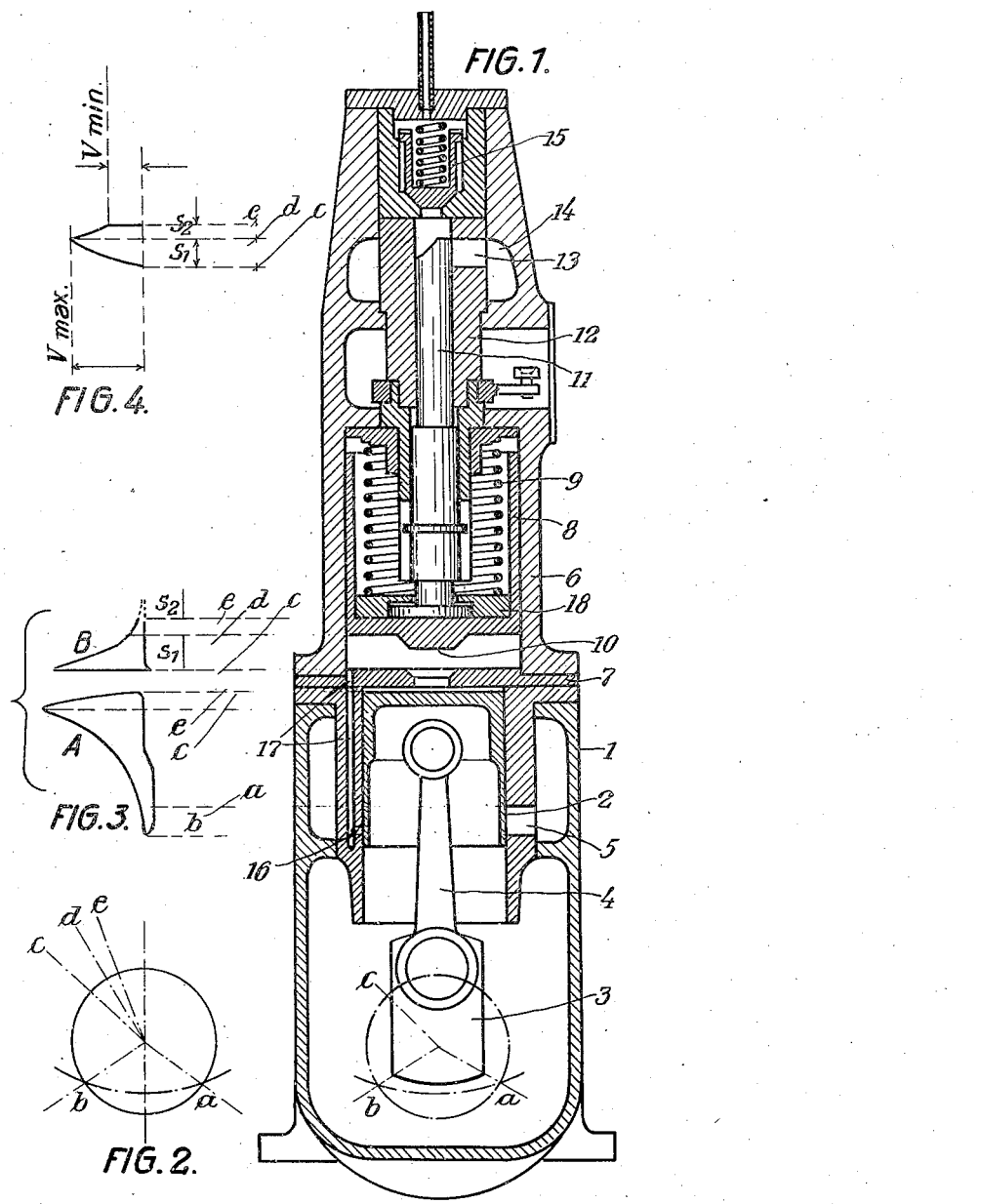

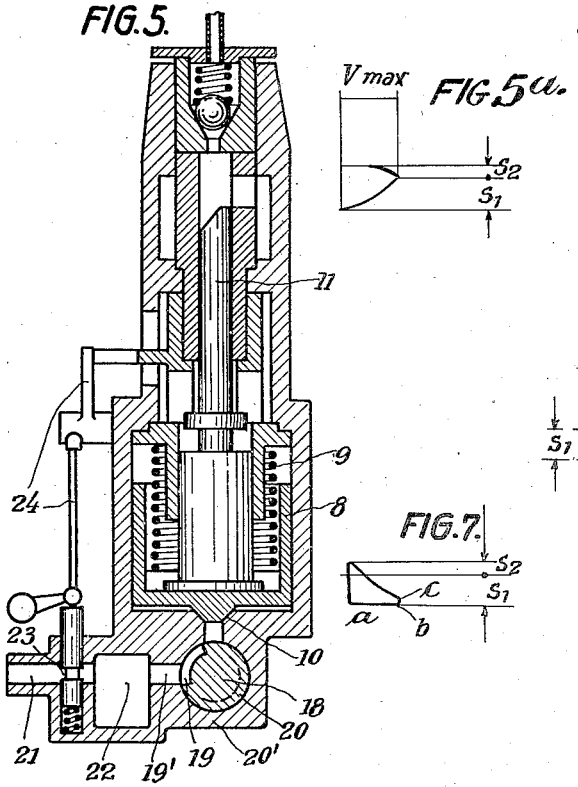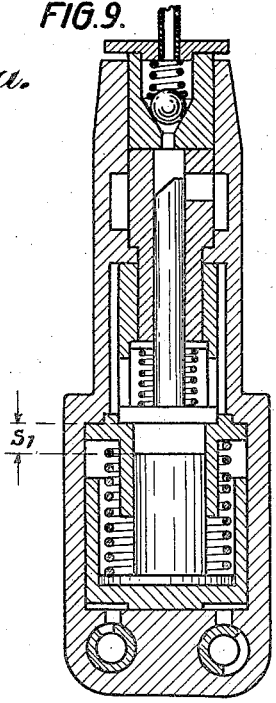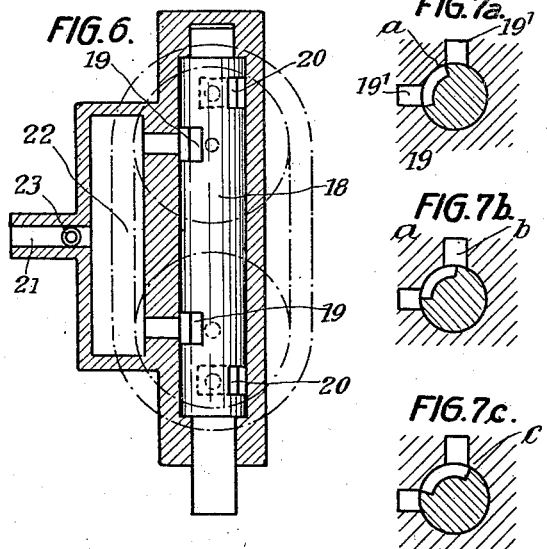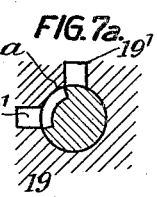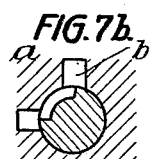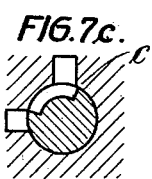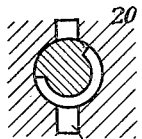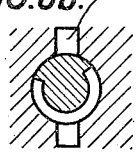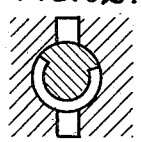

2,033,579

UNITED STATES PATENT OFFICE 2,033,579

FUEL PUMP FOR DIESEL ENGINES WITH AIR-FREE INJECTION

Wilhelm Köster and August Dussmann, Frankfort-on-the-Main, Germany; said Dussmann assignor to said Köster Application July 24, 1934, Serial No. 736,682
In Germany July 26, 1933

5 Claims. (Cl. 103—44)

There are two types of internal combustion engines. In the one fuel and air are mixed during the compression stroke of the engine.

In the other the air for combustion is compressed and mixed with the fuel approximately at the desired moment of ignition. This type of engine is usually called "Diesel engine". The injection takes place by means of compressed air.

Objections to this method are the losses due to cooling owing to the injection of air during the combustion, the power required for the injection air compressor and finally the complicated construction and high price.

In order to overcome these objections, the so-called compressorless Diesel engine has been developed during the last 20 years. In this engine the injection is effected without compressed air, that is directly by the fuel pump.

However, the constructions developed during the last 20 years possess the drawback as compared with the old Diesel engine that they represent a step backwards from a thermic technical point of view in that these engines do no longer operate according to the uniform pressure process but according to the detonation process with after-burning. Thus, the constructional pressures increase by 30 to 40%. A lower fuel consumption is not attained and the specific cylinder output could not be increased.

All these constructions are only intermediate solutions because in all instances the time is too long from the preparation of the fuel until the ignition begins. All these engines must inject 30 to 45° before the upper dead centre position during the compression.

It has been proved that the output of the Diesel engine without compressor depends to a great extent upon 1. The completeness of the atomization,
2. The smallest attainable drop size during the atomization,
3. Good distribution in the combustion in such a manner that every minutest drop of fuel is surrounded by atoms of oxygen,
4. The shortness of the injection time.

The requirements mentioned under 1 to 4 can be excellently improved by increasing the speed of the pump plunger. If this can be considerably augmented, the area of the nozzle apertures can be enlarged. Thus, the injection period is so greatly reduced that it occupies only a few degrees of the movement of the engine crank. By these measures the requirements mentioned under 1 to 4 can be fulfilled.

In ordinary fuel pumps the plunger is actuated by means of a cam. If the requirements set forth under 1 to 4 are to be fulfilled, the pitch of the cam must be extremely steep in order to attain the desired speed. However, this is restricted for practical reasons. The maximum has been attained in the known pumps. Further improvements can only be attained in such fuel pumps in which a considerable increase of the pump plunger speed is possible. As the cam is no longer sufficient, other means must be utilized. In the American patent specifications 1,864,860 and 1,949,789 proposals are set forth which endeavor to fulfill these requirements.

The object of the invention is to improve the action of the injection pump plunger by more practical arrangement of the operating mechanism as compared with Patent 1,949,789. In both instances the pump plunger is operated by compressed air but it is necessary to introduce devices which guarantee the accurate commencement of the injector, because the period of idle movement serves to transmit to the pump plunger live force, which it must impart to the atomizing mechanism when it has attained its maximum speed. On the one hand the commencement of the injection must be accurately controlled and on the other hand it must be possible to vary the commencement of the injection.

Several embodiments of the invention are illustrated by way of example in the accompanying drawings in which:—

Fig. 1 shows a fuel pump in longitudinal section.
Fig. 2 is a diagram showing the travel of the pump crank.
In Fig. 3, A and B are diagrams showing the compression of the drawn-in air and production of the energy.
Fig. 4 is a diagram illustrating the compression stroke of the pump.
Fig. 5 shows in vertical section a pump arrangement, wherein a single compressor operates a plurality of pump plungers.
Fig. 5a is a diagram showing the compression stroke of the pump illustrated in Fig. 5.
Fig. 6 shows in horizontal section the valve control of the pump arrangement illustrated in Fig. 5.
Fig. 7 is a working diagram.
Figs. 7a, 7b, and 7c show the inlet slot of the rotary valve in different positions.
Figs. 8a, 8b, and 8c show the outlet slot of the rotary valve in different positions.
Fig. 9 shows in longitudinal section a third form of construction of the fuel pump.

The fuel pump according to Fig. 1 comprises a cylinder casing 1 surrounding a cylinder 1a in which a compressor piston 2 is movable. This piston is actuated by a crank 3 and connecting rod 4. When the piston 2 is in its lower dead centre position atmospheric air is drawn in through a slot 5 in the cylinder 1a and is compressed during the upward movement of the piston 2. An air cylinder 6 is arranged above the cylinder casing 1 and separated from it by a valve plate 7. An air piston 8 moves in the air cylinder 6 and is pressed downwards by the action of a spring 9 so that a valve extension 10 sits tightly on a valve seat in the valve plate 7. During the outward stroke of the compressor piston 2 the valve 10 is opened as soon as the air pressure in the cylinder 1a is greater than the spring pressure. The compressed air then flows into the air cylinder 6 and pushes the air piston 8 upwards with accelerated speed.

Spring 9 which bears against a plate 18 engages the head of a pump plunger 11 movable in a pump cylinder 12 having a suction slot 13. The spring 9 therefore forces the plunger 11 downwards, thereby drawing fuel into the cylinder 12 through the suction slot 13. As the piston 8 ascends, it moves the plunger 11 upwards, thereby producing the delivery stroke $s_1$, $s_2$. During the first portion $s_1$ of the delivery stroke the plunger 11 passes the slot 13, a portion of the fuel drawn in being first returned without appreciable pressure into a suction chamber 14 through the slot 13, this portion of the stroke is called the idle movement. The delivery stroke proper $s_2$ commences only when the upper edge of the plunger 11 has reached the upper edge of the suction slot, this stage being designated the supply movement $s_2$.

After the compression piston 2 has passed its upper dead centre position, it moves downwards on its return stroke carrying air piston 8 with it under the action of the spring 9, the downward movement of the piston 8 being cushioned by the air compressed in the cylinders 6 and 1a between the pistons 2 and 8.

The air imprisoned in the cylinder 6 after the closing of the valve 10 is still under pressure.

The valve must open exactly at the proper time, and it is consequently necessary for the air pressure between the valve plate 7 and the piston 8 to be neutralized, this being effected through a bore 17 so that the compressing piston in its lower dead centre position exposes a bore 16 and establishes communication with the atmospheric air. The valve now closes the slot.

The pump operates in the following manner:
Figs. 2 and 3 show a—b drawing in of fresh air:

Figs. 2, 3, and 4 show b—c compressing of the drawn in air and production of the energy which corresponds to the diagram A, Fig. 3.

c—d idle travel $s_1$ and transmission of energy in the moved pump parts, d—e injection stroke, a portion of the accumulated energy being consumed or imparted to the atomizer.

The energy is, however, produced during a longer period than the consumption. The time of injection can therefore be considerably reduced without excessively stressing the driving mechanism.

During the idle travel $s_1$ the mass of the plunger parts is accelerated and attains at the end of the idle travel the speed $v$ max. This speed is braked during the effective compression stroke $s_2$, so that at the end of the pump stroke a speed of $v$ min. prevails. These operations are illustrated in Fig. 4. which shows that the injection takes place in an entirely different manner to that in the case of the hitherto known airless injector methods. The fuel jet is preferably atomized. The fuel particles first injected into the combustion chamber are therefore rapidly brought to the ignition temperature, so that the retarding of the ignition is reduced, and the thermic efficiency improved.

Figs. 5 and 6 show a pump arrangement, in which only one compressor is provided for driving several pump plungers and pumps the air into a suitably arranged chamber. The operation of the air piston 8 and of the plunger 11 is the same as in the pump shown in Fig. 1. The distribution of the operating air is, however, not effected by means of a self controlled valve, but by a mechanically driven rotary valve 18, which has an air inlet slot 19 and an air outlet slot 20. The compressed operating air flows through a conduit 21 from the compressor into a common chamber 22. A device 23 for shutting off the air is connected with regulating rods 24 in such a manner that the air admission is interrupted in the stop position, so that loss of air cannot occur when the engine is at a standstill.

From the control diagrams Figs. 7, a—c and 8, a—c the operation of the air distribution can be seen.

Fig. 7a shows the air inlet slot 19 shortly prior to the opening of the inflow bore 19¹. The valve 10 is kept closed (a—b) by the spring 9 until the air pressure is capable of acting without appreciable flow losses. At b, Fig. 7b, the valve 10 opens, so that the air pressure acts on the whole surface of the piston 8. At c, Fig. 7c, the air admission is interrupted, the air charge continuing to expand, the piston 8 being further accelerated. The energy accumulated during the idle travel is converted into atomizing energy at the end of the idle travel in the manner already described. The operation is illustrated in the working diagram Fig. 7. Figs. 8a to 8c show the corresponding position of the outlet slot 20.

The rotary control valve 18 is actuated with the same means and at the same speed as the crank shaft 3 of the pump shown in Fig. 1 is driven.

In the pumps illustrated in Figs. 1 to 4 and Figs. 5—9 only the air piston 8 carries out the idle travel, whereas the pump plunger is held by a stroke limitation and therefore only participates in the effective pump stroke $s_2$.

By the above described indirect pump actuation, which is merely dependent upon the accumulated energy in the idle travel, many times the output value of the directly driven pump is attained. Therefore several nozzle holes may be employed which improves in a simple manner the quality of the mixture formation. The commencement of the injection can therefore be placed into proximity of the dead centre position. Premature ignitions which stress the engine parts to an abnormal extent and reduce the degree of mechanical efficiency, are excluded.

The construction illustrated in Fig. 9 shows an arrangement with hollow valves for supplying the compressed air to the air piston.

We claim:—

1. A fuel pump for Diesel engines with airless fuel injection, comprising in combination an air cylinder, an air piston in said cylinder, means for supplying compressed air into said cylinder to actuate said piston, a valve in said air cylinder said valve adapted to first temporarily retard the admission of air to said cylinder to accumulate energy and then transfer said energy to said piston to accelerate the movement thereof, a pump cylinder at the upper end of said air cylinder, and a pump plunger in said pump cylinder connected with said air piston and adapted to eject fuel from said pump cylinder, said air piston adapted to impart its accelerated movement to said plunger piston, the upper end of said plunger shaped to first check the ejection of fuel from said pump cylinder and then suddenly release the same so that the ejection takes place at maximum speed.

2. In a fuel pump as specified in claim 1 a low pressure chamber and a compression chamber, the end of said plunger cut away at an angle so that during its compression stroke it first establishes communication between said low pressure chamber and said compression chamber at the commencement of its stroke during which it receives its maximum acceleration before the commencement of the fuel injection, and then interrupts the communication between said two chambers to commence the fuel injection at maximum speed.

3. In a fuel pump for Diesel engines with airless fuel injection, the combination of an air cylinder a compressor cylinder below the air cylinder, a mechanically reciprocated compressor piston in said compressor cylinder, a valve seat between said compressor cylinder and said air cylinder, a valve extension on the air piston, a spring adapted to press downwards said air piston to press said extension on to said valve seat and shut off communication between said compressor cylinder and said air cylinder until the air in said compressor cylinder has attained a certain pressure and then to yield and allow said valve extension to lift off said valve seat and allow the compressed air to enter said air chamber in highly compressed state and accelerate the movement of said air piston during its idle stroke, said spring adapted to then retard the movement of said air piston and then again press said extension on to said valve seat, said compressor cylinder having a bore communicating with said air cylinder and the atmosphere and controlled by said compressor piston, said bore adapted to allow the escapement of the air confined in said air chamber and said spring to act with its full force to press said extension tightly on to said valve seat.

4. In a fuel pump as specified in claim 1 in which one compressor is provided for operating several pump plungers; the combination of a control slide valve having control grooves one for each air cylinder, each air cylinder having an inlet and outlet port controlled by said grooves.

5. In a fuel pump as specified in claim 1 in which one compressor is provided for operating several pump lungers, the combination of a control slide valve having control grooves one for each air cylinder, each air cylinder having an inlet and outlet port controlled by said grooves, a shut off element adapted to control the air supply to said control slide, and a pump regulating rod connected with said shut off element and adapted to automatically close said shut off element when the pump is at a standstill.

WILHELM KÖSTER.
AUGUST DUSSMANN.